United States Patent
Eadie et al.

(10) Patent No.: US 10,640,203 B2
(45) Date of Patent: May 5, 2020

(54) ROTORCRAFT ROTOR AND PROPELLER SPEED

(71) Applicant: SIKORSKY AIRCRAFT CORPORATION, Stratford, CT (US)

(72) Inventors: William J. Eadie, Cheshire, CT (US); Patrick Boyle, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 203 days.

(21) Appl. No.: 15/504,250

(22) PCT Filed: Oct. 1, 2015

(86) PCT No.: PCT/US2015/053432
§ 371 (c)(1),
(2) Date: Feb. 15, 2017

(87) PCT Pub. No.: WO2016/054331
PCT Pub. Date: Apr. 7, 2016

(65) Prior Publication Data
US 2017/0275014 A1    Sep. 28, 2017

Related U.S. Application Data

(60) Provisional application No. 62/058,424, filed on Oct. 1, 2014.

(51) Int. Cl.
*B64C 27/10* (2006.01)
*F16F 15/02* (2006.01)
(Continued)

(52) U.S. Cl.
CPC ............ *B64C 27/10* (2013.01); *B64C 1/0009* (2013.01); *B64C 7/00* (2013.01); *B64C 13/04* (2013.01);
(Continued)

(58) Field of Classification Search
CPC .................. B64C 2027/8236; B64C 27/00
See application file for complete search history.

(56) References Cited

U.S. PATENT DOCUMENTS 1,344,486 A    6/1920    Coffelt
2,469,144 A    5/1949    Baggott
(Continued)

FOREIGN PATENT DOCUMENTS

EP         2778048 A1       9/2014
EP         2778048 A1       5/2015
WO      2015061857 A1       7/2013

OTHER PUBLICATIONS (CNET) "Sikorsky S-97 Helicopter Shoots for Speed with Unusual Design" Oct. 3, 2014; 7 pages.
(Continued)

*Primary Examiner* — Richard G Davis
(74) *Attorney, Agent, or Firm* — Cantor Colburn LLP

(57) ABSTRACT

An aircraft includes an airframe having an extending tail, a counter rotating, coaxial main rotor assembly disposed at the airframe including an upper rotor assembly and a lower rotor assembly, and a translational thrust system positioned at the extending tail and providing translational thrust to the airframe, the translational thrust system including a propeller. A gearbox system is operably connected to the main rotor assembly and the propeller to drive rotation of the main rotor assembly and the propeller. The gearbox is configured to maintain a main rotor assembly tip speed below Mach 0.9 and a propeller helical tip speed below Mach 0.88.

4 Claims, 17 Drawing Sheets

(51) Int. Cl.

| | | |
|---|---|---|
| *B64C 27/00* | (2006.01) | |
| *B64C 27/14* | (2006.01) | |
| *B64C 1/00* | (2006.01) | |
| *B64C 7/00* | (2006.01) | |
| *B64C 13/18* | (2006.01) | |
| *B64C 13/50* | (2006.01) | |
| *B64C 19/00* | (2006.01) | |
| *B64C 27/12* | (2006.01) | |
| *B64C 27/16* | (2006.01) | |
| *B64C 27/32* | (2006.01) | |
| *B64C 27/33* | (2006.01) | |
| *B64C 27/473* | (2006.01) | |
| *B64C 27/48* | (2006.01) | |
| *B64C 27/51* | (2006.01) | |
| *B64C 27/52* | (2006.01) | |
| *B64C 27/54* | (2006.01) | |
| *B64C 27/78* | (2006.01) | |
| *B64C 27/80* | (2006.01) | |
| *B64C 27/82* | (2006.01) | |
| *B64D 39/00* | (2006.01) | |
| *B64D 39/06* | (2006.01) | |
| *B64D 45/02* | (2006.01) | |
| *F16H 37/02* | (2006.01) | |
| *G05D 1/00* | (2006.01) | |
| *G05D 1/02* | (2020.01) | |
| *B64C 13/04* | (2006.01) | |
| *G05D 1/08* | (2006.01) | |
| *B64C 27/57* | (2006.01) | |
| *B64D 35/06* | (2006.01) | |
| *B64C 27/467* | (2006.01) | |
| *B64C 27/08* | (2006.01) | |
| *F02C 9/28* | (2006.01) | |
| *F16D 13/52* | (2006.01) | |
| *F16D 13/72* | (2006.01) | |
| *F16D 13/74* | (2006.01) | |

(52) U.S. Cl.
CPC .............. *B64C 13/18* (2013.01); *B64C 13/50* (2013.01); *B64C 13/503* (2013.01); *B64C 19/00* (2013.01); *B64C 27/001* (2013.01); *B64C 27/006* (2013.01); *B64C 27/008* (2013.01); *B64C 27/12* (2013.01); *B64C 27/14* (2013.01); *B64C 27/16* (2013.01); *B64C 27/32* (2013.01); *B64C 27/322* (2013.01); *B64C 27/33* (2013.01); *B64C 27/467* (2013.01); *B64C 27/473* (2013.01); *B64C 27/48* (2013.01); *B64C 27/51* (2013.01); *B64C 27/52* (2013.01); *B64C 27/54* (2013.01); *B64C 27/57* (2013.01); *B64C 27/78* (2013.01); *B64C 27/80* (2013.01); *B64C 27/82* (2013.01); *B64D 35/06* (2013.01); *B64D 39/00* (2013.01); *B64D 39/06* (2013.01); *B64D 45/02* (2013.01); *F16F 15/02* (2013.01); *F16H 37/02* (2013.01); *G05D 1/0077* (2013.01); *G05D 1/0202* (2013.01); *G05D 1/0816* (2013.01); *G05D 1/0858* (2013.01); *B64C 27/08* (2013.01); *B64C 2027/004* (2013.01); *B64C 2027/8209* (2013.01); *B64C 2027/8227* (2013.01); *B64C 2027/8236* (2013.01); *B64C 2027/8263* (2013.01); *B64C 2027/8272* (2013.01); *B64C 2027/8281* (2013.01); *B64C 2201/024* (2013.01); *F02C 9/28* (2013.01); *F05D 2220/329* (2013.01); *F05D 2270/021* (2013.01); *F16D 13/52* (2013.01); *F16D 13/72* (2013.01); *F16D 13/74* (2013.01); *G05D 1/0204* (2013.01); *G05D 1/08* (2013.01)

(56) References Cited

U.S. PATENT DOCUMENTS

| | | | |
|---|---|---|---|
| 2,482,460 A * | 9/1949 | Browne | B64D 35/04 |
| | | | 180/53.1 |
| 2,698,147 A | 12/1954 | Hovgard | |
| 2,814,451 A | 11/1957 | Turner et al. | |
| 2,959,373 A | 11/1960 | Zuck | |
| 3,351,304 A | 11/1967 | Stein et al. | |
| 3,448,946 A | 6/1969 | Nagatsu | |
| 3,506,219 A | 4/1970 | Mouille et al. | |
| 3,822,105 A | 7/1974 | Jepson | |
| 4,020,324 A | 4/1977 | Buscher et al. | |
| 4,386,848 A | 6/1983 | Clendenin et al. | |
| 4,657,208 A | 4/1987 | Miller | |
| 4,730,795 A * | 3/1988 | David | B64C 27/22 |
| | | | 244/17.21 |
| 4,928,907 A | 5/1990 | Zuck | |
| 5,131,603 A | 7/1992 | Meyers | |
| 6,086,016 A | 7/2000 | Meek | |
| 6,098,921 A | 8/2000 | Piasecki | |
| 6,435,453 B1 * | 8/2002 | Carter, Jr. | B64C 27/02 |
| | | | 244/17.11 |
| 6,460,802 B1 | 10/2002 | Norris | |
| 6,513,752 B2 | 2/2003 | Carter, Jr. | |
| 6,561,456 B1 | 5/2003 | Devine | |
| 6,641,365 B2 | 11/2003 | Karem | |
| 6,655,631 B2 | 12/2003 | Austen-Brown | |
| 7,017,857 B2 | 3/2006 | Hill et al. | |
| D524,718 S | 7/2006 | Scott et al. | |
| D526,269 S | 8/2006 | Eadie | |
| 7,296,767 B2 | 11/2007 | Palcic et al. | |
| 7,434,764 B2 * | 10/2008 | Lappos | B64C 27/14 |
| | | | 244/17.11 |
| 7,438,259 B1 | 10/2008 | Piasecki et al. | |
| 7,535,380 B2 | 5/2009 | Bertin | |
| 7,648,338 B1 | 1/2010 | Welsh | |
| D614,559 S | 4/2010 | Alber et al. | |
| 7,758,310 B2 | 7/2010 | Cotton et al. | |
| 7,836,701 B2 | 11/2010 | Zack et al. | |
| 7,857,598 B2 | 12/2010 | McGeer et al. | |
| 7,942,365 B2 | 5/2011 | Palcic et al. | |
| 7,967,239 B2 * | 6/2011 | Cotton | B64C 27/10 |
| | | | 244/17.19 |
| 8,019,490 B2 | 9/2011 | Ferren et al. | |
| 8,181,901 B2 | 5/2012 | Roesch | |
| D665,720 S | 8/2012 | Stille et al. | |
| 8,403,255 B2 | 3/2013 | Piasecki | |
| 8,583,295 B2 | 11/2013 | Eglin et al. | |
| 8,655,510 B2 | 2/2014 | Elgin | |
| 8,827,204 B2 | 9/2014 | Long et al. | |
| 8,864,062 B2 | 10/2014 | Karem | |
| 8,991,744 B1 * | 3/2015 | Khan | B64C 27/52 |
| | | | 244/17.11 |
| 8,998,127 B2 | 4/2015 | Sonneborn | |
| 9,038,801 B2 | 5/2015 | Norem et al. | |
| 9,096,330 B2 * | 8/2015 | Nathan | G01C 23/00 |
| 9,180,964 B2 | 11/2015 | Smith et al. | |
| 10,287,011 B2 | 5/2019 | Wolff et al. | |
| 2002/0005455 A1 | 1/2002 | Carter, Jr. | |
| 2005/0151001 A1* | 7/2005 | Loper | B64C 27/14 |
| | | | 244/6 |
| 2006/0269413 A1 | 11/2006 | Cotton et al. | |
| 2006/0269418 A1* | 11/2006 | Bagai | B64C 27/10 |
| | | | 416/223 R |
| 2007/0181741 A1 | 8/2007 | Darrow, Jr. et al. | |
| 2008/0237392 A1 | 10/2008 | Piasecki et al. | |
| 2008/0315035 A1 | 12/2008 | Lappos et al. | |
| 2009/0159740 A1 | 6/2009 | Brody et al. | |
| 2010/0001120 A1 | 1/2010 | Sun | |
| 2010/0254817 A1 | 10/2010 | Agnihotri et al. | |
| 2010/0264258 A1 | 10/2010 | Sirohi et al. | |
| 2011/0010936 A1 | 1/2011 | Owen | |
| 2011/0024555 A1 | 2/2011 | Kuhn, Jr. | |

(56) References Cited

U.S. PATENT DOCUMENTS

| | | | |
|---|---|---|---|
| 2012/0168556 | A1 | 7/2012 | Sonneborn |
| 2012/0292441 | A1* | 11/2012 | Drela .................. B64C 21/06 244/1 N |
| 2013/0180403 | A1 | 7/2013 | Norem |
| 2013/0334360 | A1 | 12/2013 | Norem et al. |
| 2014/0021291 | A1 | 1/2014 | Vetter |
| 2014/0023499 | A1 | 1/2014 | Collingbourne |
| 2014/0030103 | A1 | 1/2014 | Matalanis et al. |
| 2014/0034774 | A1 | 2/2014 | Ferrier et al. |
| 2014/0095001 | A1 | 4/2014 | Cherepinsky |
| 2015/0028152 | A1 | 1/2015 | Eller et al. |
| 2015/0210378 | A1 | 7/2015 | Embacher |
| 2015/0246725 | A1 | 9/2015 | Reilly |
| 2016/0318600 | A1 | 11/2016 | Wirasnik |
| 2017/0220048 | A1 | 8/2017 | Eadie et al. |
| 2017/0225775 | A1 | 8/2017 | Eadie et al. |
| 2017/0274990 | A1 | 9/2017 | Eadie et al. |
| 2017/0274994 | A1 | 9/2017 | Eller et al. |
| 2017/0277201 | A1 | 9/2017 | Bredenbeck et al. |
| 2017/0297692 | A1 | 10/2017 | Eadie et al. |
| 2017/0305544 | A1 | 10/2017 | Eadie et al. |

OTHER PUBLICATIONS

Bourtsev, Boris et al.; "Coaxial Helicopter Rotor Design & Aeromechanics" Twentyfifth European Rotorcraft Forum, 1999, pp. 1-20.
Coleman, Colin P. "A Survey of Theoretical and Experimental Coaxial Rotor Aerodynamic Research", Nasa Technical Paper 3675, 1997, pp. 1-34.
Defense Update "Sikorsky Forms a Team to Develop the X2 Raider Armed Scout Helicopter", 2010, pp. 1-3.
European Search Report for EP Application No. 15846784.5 dated Feb. 16, 2018; 7 pages.
FlightLearnings.com, "Radius of Turn" http://www.flightlearnings.com/2009/08/26/radius-of-turn/, 2019, pp. 1-6.
H-92 Superhawk Multi-Mission Helicopter. AirForce-Technology.com, Aug. 30, 2014; retrieved online: <https://web.archive.org/web/20140830025048/http://aitforce-technology.com/projects/superhawk/>; pp. 2-4.
http://www.hightech-edge.com/sikorsky-x2-raider-s-97-high-speed-military-helicopter/7936/,(New High Tech-EDGE) posted on Oct. 23, 2010.
http://www.scribb.com/doc/159484608/Aerodynamics-Clancy#scribd, Published by: Arvind Rajan on Aug. 11, 2013, Clancy L.J.—Aerodynamics 1st Edition 1975 p. 407 Equation 14.9.
https://web.archive.org/web/20130711053743/http://www.cfidarren.com/hlesson5.htm, (Smith) Jul. 11, 2013.
International Search Report and Written Opinion for International Application No. PCT/US2015/051897; International Filing Date Sep. 24, 2015; Report dated Apr. 8, 2019 (pp. 1-19).
International Search Report and Written Opinion for International Application No. PCT/US2015/052142; International Filing Date Sep. 25, 2015; Report dated Apr. 8, 2016 (pp. 1-17).
International Search Report and Written Opinion for International Application No. PCT/US2015/052645; International Filing Date Sep. 28, 2015; Report dated Feb. 9, 2019 (pp. 1-13).
International Preliminary Report on Patentability for International Application No. PCT/US2015/052123; International Filing Date Sep. 25, 2015; Report dated Apr. 13, 2017 (pp. 1-6).
International Preliminary Report on Patentability for International Application No. PCT/US2015/052645; International Filing Date Sep. 28, 2015; Report dated Apr. 13, 2017 (pp. 1-8).
International Preliminary Report on Patentability for International Application No. PCT/US2015/052142; International Filing Date Sep. 25, 2015; Report dated Apr. 13, 2017 (pp. 1-7).
International Preliminary Report on Patentability for International Application No. PCT/US2015/051901; International Filing Date Sep. 24, 2015; Report dated Apr. 13, 2017 (pp. 1-7).
International Preliminary Report on Patentability for International Application No. PCT/US2015/051897; International Filing Date Sep. 24, 2015; Report dated Apr. 13, 2017 (pp. 1-10).
International Preliminary Report on Patentability for International Application No. PCT/US2015/053432; International Filing Date Oct. 1, 2015; Report dated Apr. 13, 2017 (pp. 1-6).
International Preliminary Report on Patentability for International Application No. PCT/US2015/053070; International Filing Date Sep. 30, 2015; Report dated Apr. 13, 2017 (p. 1-6).
Johnson, Wayne Design and Performance of Lift-Offset Rotorcraft for Short-Haul Missions; Jan. 18, 2012; pp. 1-26.
Johnson, Wayne; "Influence of Lift Offset on Rotorcraft Performance", Aeromechanics Branch, NASA Ames Research Center, Moffett Field, California; presented Jan. 23, 2008; 31 pages.
International Search Report for International Application No. PCT/US2015/052123; International Filing Date Sep. 25, 2015; Report dated Dec. 17, 2015 (pp. 1-14).
International Search Report for International Application No. PCT/US2015/053070; International Filing Date Sep. 30, 2015; Report dated Dec. 29, 2015 (pp. 1-19).
International Search Report for International Application No. PCT/US2015/053432; International Filing Date Oct. 1, 2015; Report dated Feb. 26, 2016 (pp. 1-13).
International Search Report for International Application No. PCT/US2015/053241; International Filing Date Sep. 30, 2015; Report dated Feb. 23, 2016 (pp. 1-12).
International Search Report for International Application No. PCT/US2015/051901; International Filing Date Sep. 24, 2015; Report dated Feb. 12, 2016 (pp. 1-12).
S-69 (XH-59A) Advancing Blade Concept Demonstrator, Sikorsky Archives, Apr. 21, 2013 retrieved online: <http://www.sikorskyarchives.com/S-69%20(XH-59A).php>; pp. 1, 4-6, 11 and 12.
Walsh, et al. "High Airspeed Testing of the Sikorsky X2 Technology Demonstrator" May 4, 2011 (pp. 1-12).
Captain America, the Winter Soldier, Anthony Russo, Joe Russo, Kevin Feige, Christopher Markus, Stephen McFeely—Walt Disney Studios Motion Pictures—2014.
Helicopter Gunnery, FM 1-140, Headquarters, Dept. of the Army—Oct. 1986.
Lee et al. "Experimental hover performance evaluation on a small-scale rotor using a rotor test stand" Journal of Mechanical Science and Technology, vol. 25; pp. 1449-1456 (2011).
Williams et al. "Determination of the (Ideal Practical) Hover Efficiency of Circulation Control Rotors" Naval ship research and development center; Aug. 1971 (pp. 1-55).
www.globalsecurity.org/military/systems/aircraft/X2.htm.

* cited by examiner

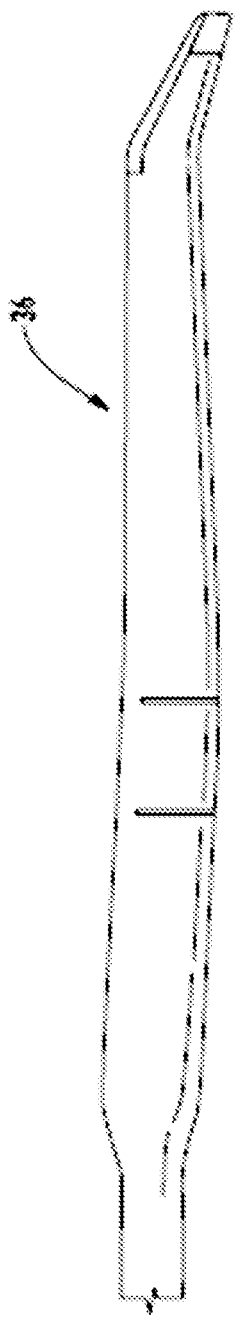

US 10,640,203 B2

ROTORCRAFT ROTOR AND PROPELLER SPEED

CROSS REFERENCE TO RELATED APPLICATIONS

This application is a National Stage application of PCT/US2015/053432, filed Oct. 1, 2015, which claims the benefit of U.S. Provisional Application No. 62/058,424, filed Oct. 1, 2014, both of which are incorporated by reference in their entirety herein.

PRIORITY CLAIM

The present application claims priority to provisional application 62/058,424 filed on Oct. 1, 2014, the contents of which are incorporated herein by reference.

BACKGROUND

The subject matter disclosed herein relates generally to rotary wing aircraft and, more particularly, to a dual rotor, rotary wing aircraft.

A typical rotary wing aircraft, or helicopter, includes a main rotor assembly that provides lift for the aircraft. The main rotor assembly is secured to an airframe that often includes an extending tail. In many such aircraft, a tail rotor is located at the extending tail. In some other aircraft, an auxiliary propulsor is located at the extending tail. Some main rotor assemblies are configured as dual coaxial rotor systems, having an upper rotor assembly rotating in a first direction and a lower rotor assembly, coaxial to the upper rotor assembly and rotating in a second direction opposite the first direction. It is desired to increase the operational abilities of such aircraft.

BRIEF SUMMARY

In one embodiment, an aircraft includes an airframe having an extending tail, a counter rotating, coaxial main rotor assembly disposed at the airframe including an upper rotor assembly and a lower rotor assembly, and a translational thrust system positioned at the extending tail and providing translational thrust to the airframe, the translational thrust system including a propeller. A gearbox system is operably connected to the main rotor assembly and the propeller to drive rotation of the main rotor assembly and the propeller. The gearbox is configured to maintain a main rotor assembly tip speed below Mach 0.9 and a propeller helical tip speed below Mach 0.88.

Additionally or alternatively, in this or other embodiments the gearbox is configured to maintain the main rotor assembly tip speed between about Mach 0.57 and Mach 0.68 during hover operation of the aircraft.

Additionally or alternatively, in this or other embodiments the gearbox is configured to maintain the propeller helical tip speed between about Mach 0.72 and Mach 0.84 during hover operation of the aircraft.

Additionally or alternatively, in this or other embodiments the propeller helical tip speed is in the range of about Mach 0.76 to Mach 0.80 during cruise operation of the aircraft.

Additionally or alternatively, in this or other embodiments an airspeed of the aircraft is between about 200 knots and 250 knots, the main rotor assembly tip speed is about Mach 0.9.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2A depicts a planform of a rotor blade in an embodiment;

DETAILED DESCRIPTION

Figure 1:
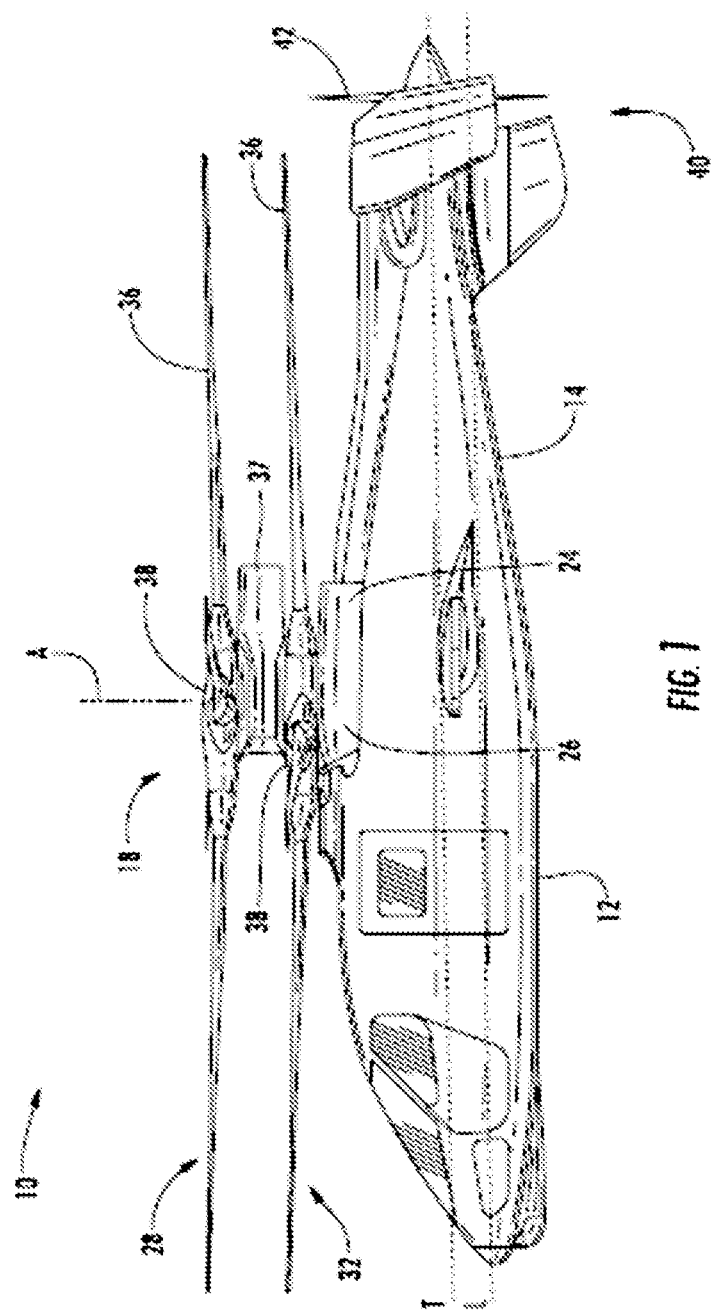
FIG. 1 depicts a rotary wing aircraft in an embodiment.

FIG. 1 depicts an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes two seats for flight crew (e.g., pilot and co-pilot) and six seats for passengers. The main rotor assembly 18 is driven by a power source, for example, one or more engines 24 via a gearbox 26. The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. In some embodiments, the aircraft 10 further includes a translational thrust system 40 located at the extending tail 14 to provide translational thrust (forward or rearward) for aircraft 10.

Any number of blades 36 may be used with the rotor assembly 18. FIG. 2A depicts a planform of a rotor blade 36 in an exemplary embodiment. The rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments of the invention. Although, the dual rotor system is depicted as coaxial, embodiments include dual rotor aircraft having non-coaxial rotors.

The translational thrust system 40 includes a propeller 42 connected to and driven by the engine 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of propeller 42. While shown in the context of a pusher-prop configuration, it is understood that the propeller 42 could also be more conventional puller prop or could be variably facing so as to provide yaw control in addition to or instead of translational thrust. It should be understood that any such system or other translational thrust systems may alternatively or additionally be utilized. Alternative translational thrust systems may include different propulsion forms, such as a jet engine.

Figure 2:
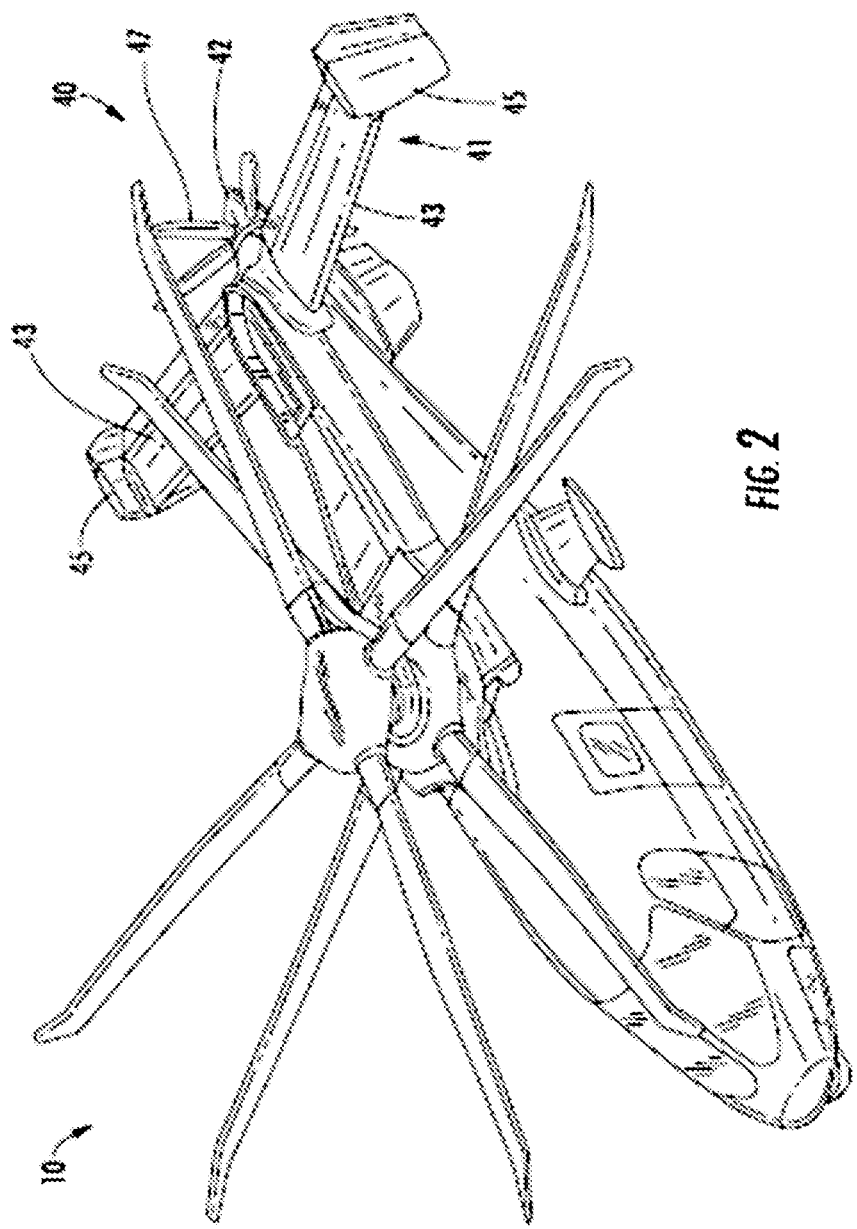
FIG. 2 is a perspective view of a rotary wing aircraft in an embodiment.

Referring to FIG. 2, translational thrust system 40 includes a propeller 42 and is positioned at a tail section 41 of the aircraft 10. Propeller 42 includes a plurality of blades 47. In exemplary embodiments, the pitch of propeller blades 47 may be altered to change the direction of thrust (e.g., forward or rearward). The tail section 41 includes active elevators 43 and active rudders 45 as controllable surfaces.

Figure 3:
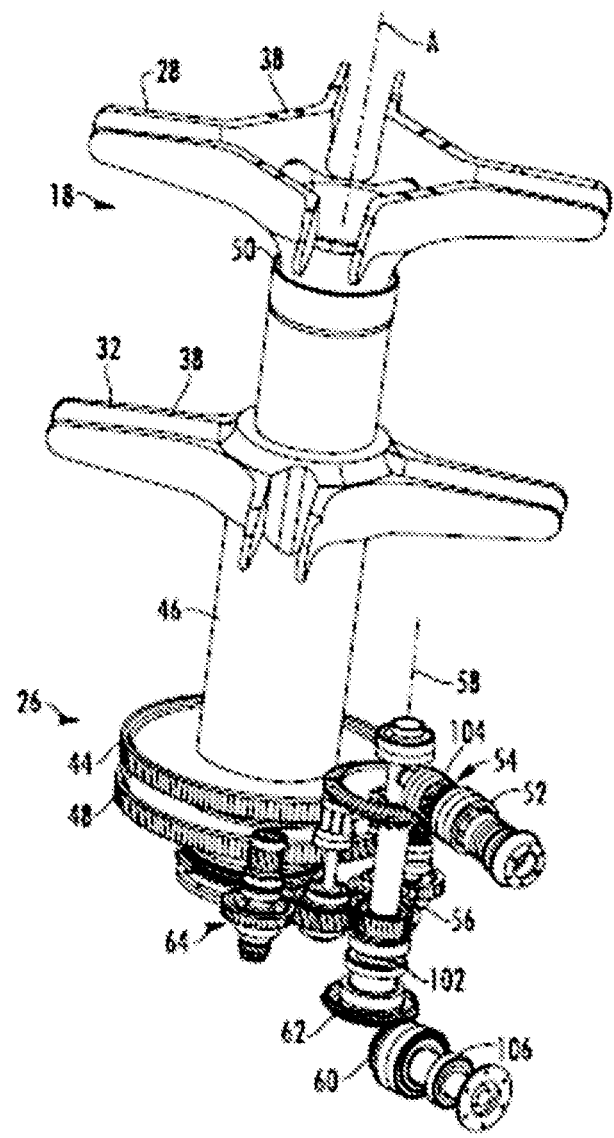
FIG. 3 is a perspective view of a gear train for a rotary wing aircraft in an embodiment.

Shown in FIG. 3 is a perspective view of portions of main rotor assembly 18 and gearbox 26. The gearbox 26 includes an upper bull gear 44 rotates about the main rotor axis, A, and connected to the lower rotor assembly 32 via a lower rotor shaft 46 extending along the main rotor axis, A. A lower bull gear 48 rotates about the main rotor axis, A, and is connected to the upper rotor assembly 28 via an upper rotor shaft 50 extending along the main rotor axis, A, and through an interior of the lower rotor shaft 46. Torque and rotational speed are provided to the gearbox 26 via input shaft 52 that transmits the torque and rotational speed from the engine(s) 24 to an input bevel gear 54 disposed at an input bevel shaft 56 of the gearbox 26 via an input bevel pinion 104. In some embodiments, the input bevel shaft 56 rotates about an input bevel shaft axis 58 parallel to the main rotor axis A. The propeller 42 is driven by a propeller output shaft 106 driven by a propeller output gear 62 disposed at a quill shaft 102, or an extension of input bevel shaft 56. Transfer from the propeller output gear 62 is achieved via connection with a propeller output pinion 60 at the propeller output shaft 106. To transfer torque from the input bevel shaft 56 to the lower rotor assembly 32 and the upper rotor assembly 30, the gearbox 26 includes a torque split gear reduction stage 64. The torque split gear reduction stage 64 splits torque from the input shaft 52 and applies the divided torque to bull gears 44 and 48, respectively. While shown with the propeller output shaft 106 driven by the propeller output gear 62, it is understood that such elements could be removed where the propeller 42 is not used or is separately driven.

Figure 3A:
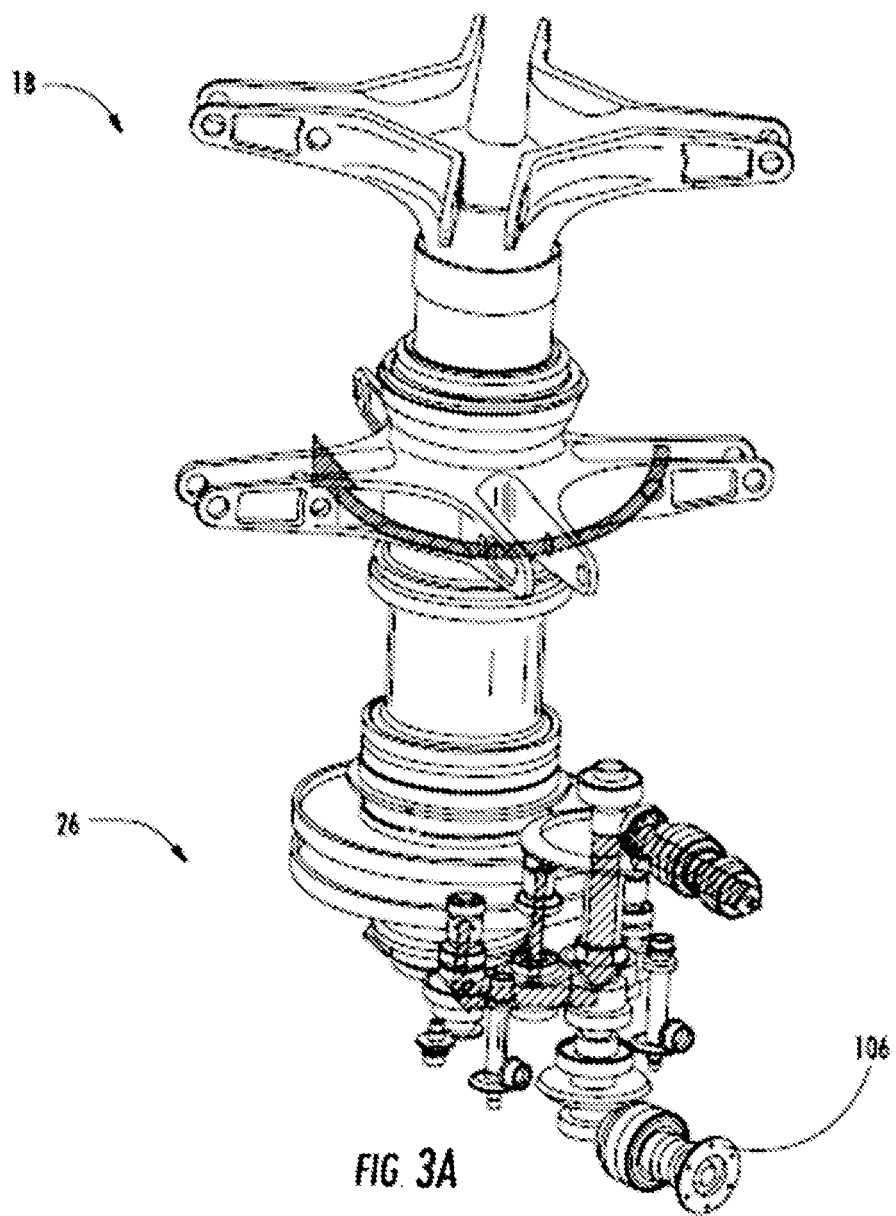
FIGS. 3A and 3B depict power distribution in the gear box in hover and cruise modes in embodiments.

FIG. 3A illustrates power distribution through gearbox 26 to main rotor assembly 18 and propeller output shaft 106 during hover mode. In hover, power flows to torque split section to drive main rotor assembly 18. The propeller output shaft 106 spins at all times to drive features on propeller box while propeller 42 is unclutched. During hover mode, the majority of power flows to the main rotor assembly 18.

Figure 3B:
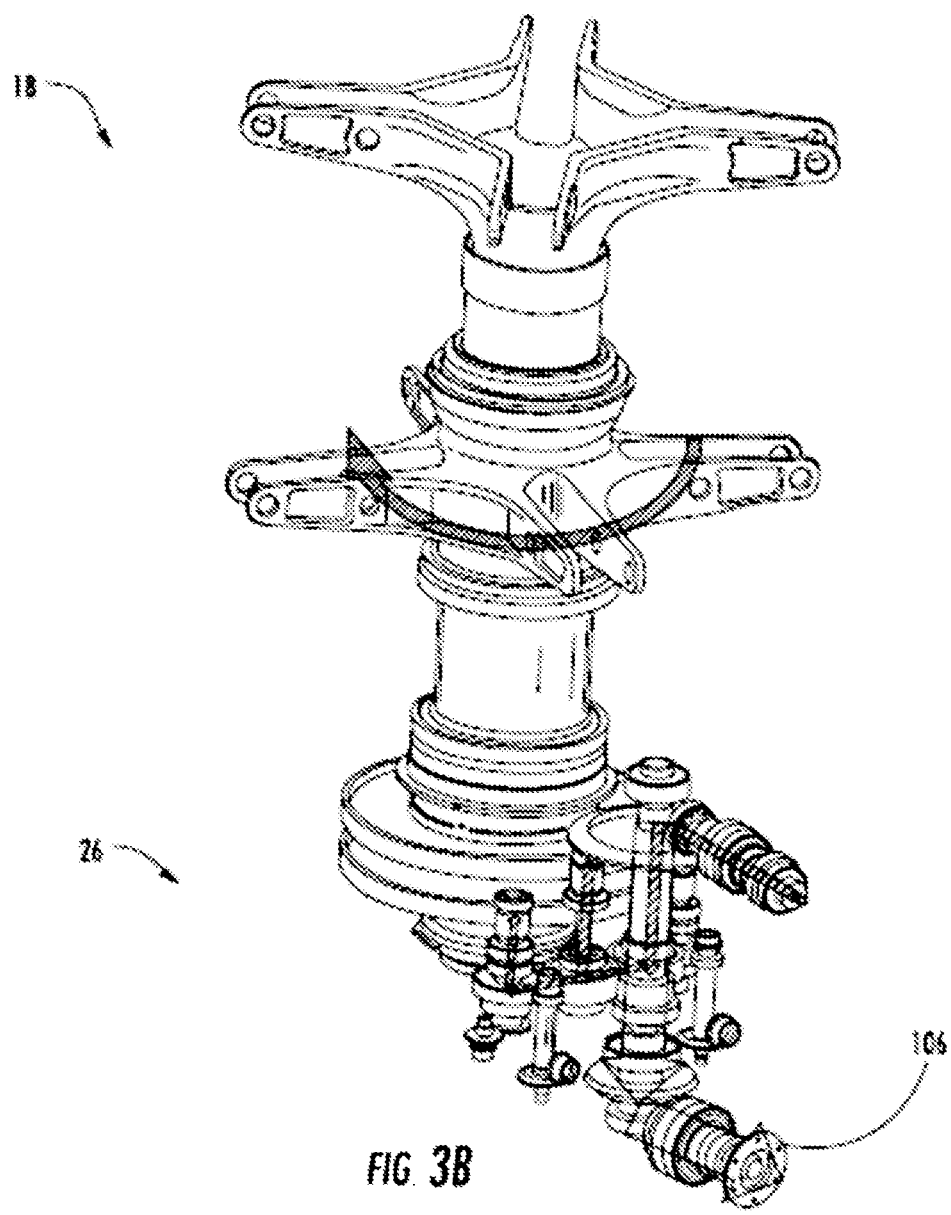

FIG. 3B illustrates power distribution through gearbox 26 to main rotor assembly 18 and propeller output shaft 106 during cruise mode. In high speed cruise, the majority of power flows to the propeller output shaft 106 while the main rotor assembly 18 is operating near an autorotative state.

Figure 3C:
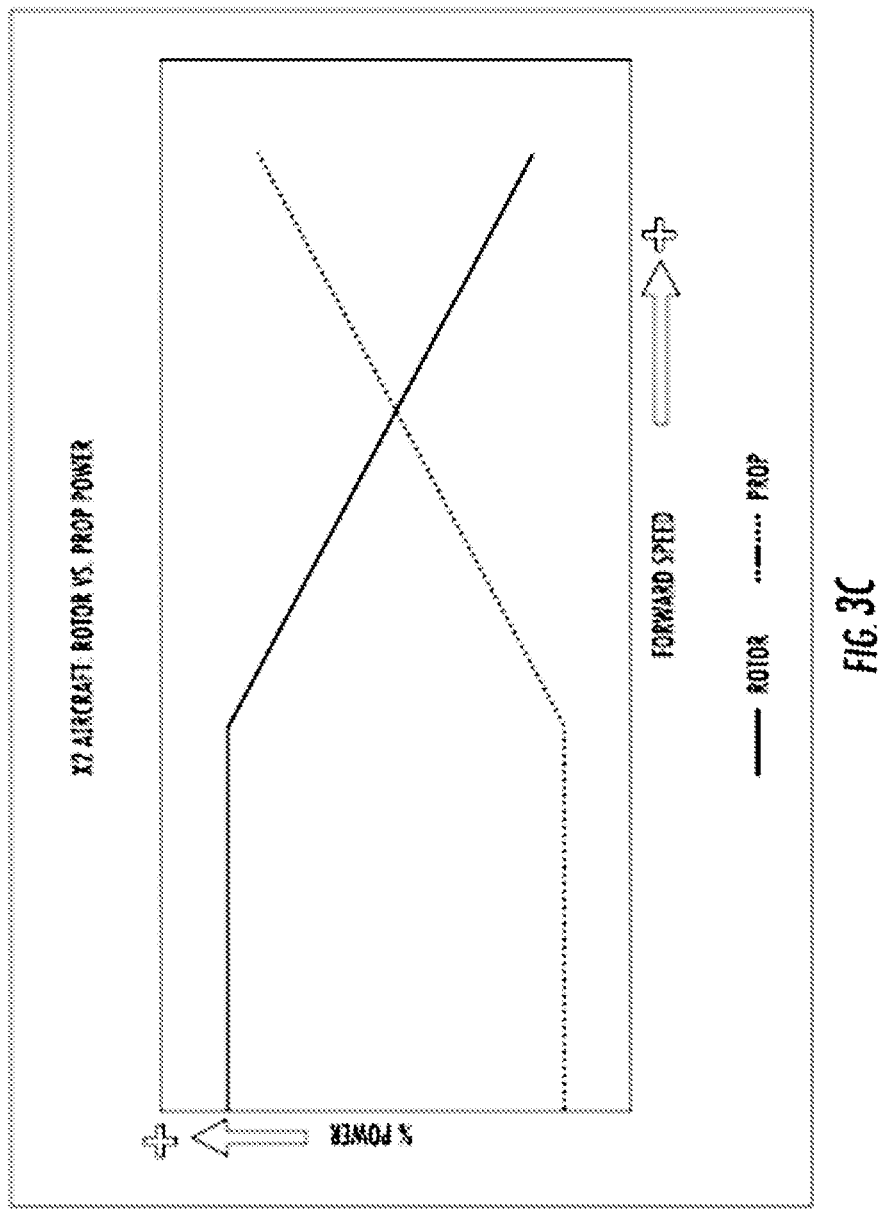
FIG. 3C depicts plots of percentage of power versus airspeed for a main rotor assembly and a propeller in an embodiment.

FIG. 3C depicts a plot of percentage of power versus airspeed for the main rotor assembly 18 and the propeller 42. The power between the main rotor assembly 18 and the propeller 42 is inversely proportional to air speed, once the aircraft reaches a propeller engagement speed. For example, at low airspeeds (e.g. below 100 kts), power is 100% used by the main rotor assembly 18. At the transition speed where the propeller 42 engages, the propeller 42 begins to use aircraft power. As airspeed increases, the main rotor assembly 18 power decreases and the propeller 42 power increases.

Figure 4:
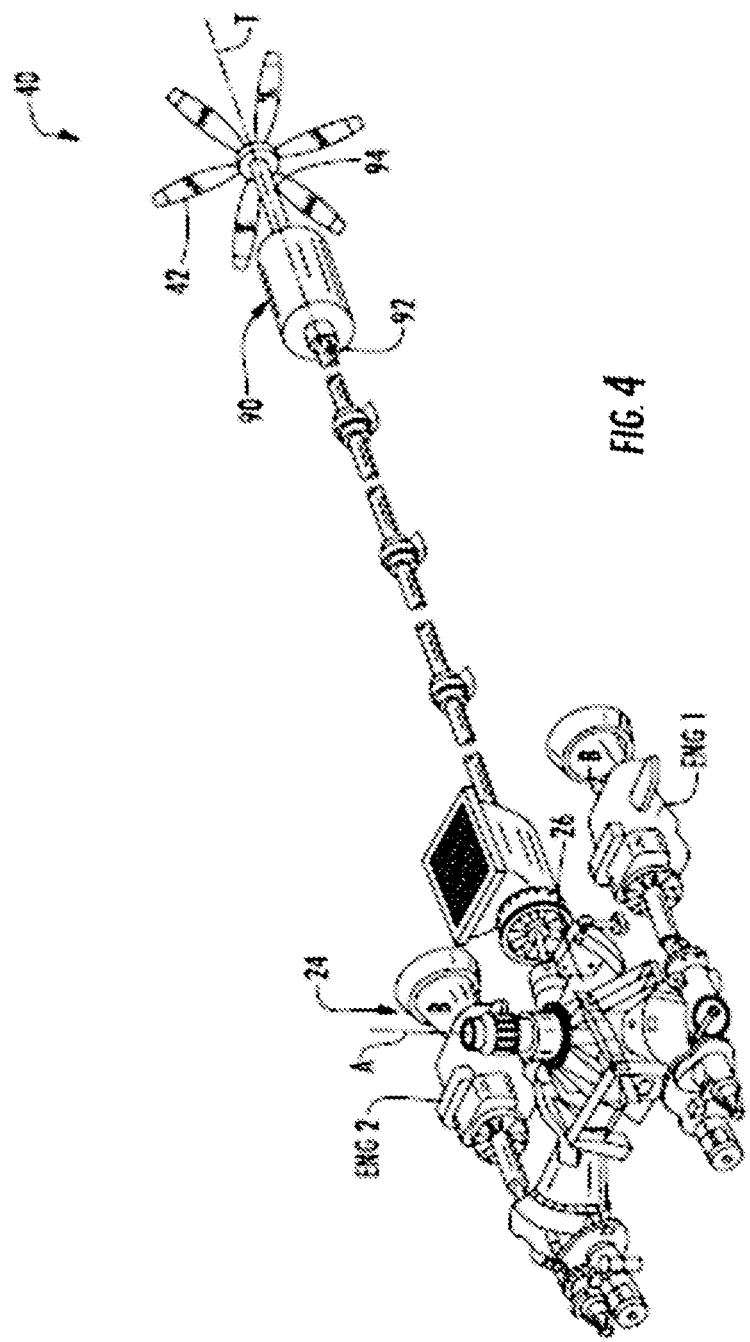
FIG. 4 is a perspective view of a gearbox and translational thrust system in an embodiment.

Referring to FIG. 4, the main rotor assembly 18 is driven about the axis of rotation, A, through a main gearbox (MGB) 26 by a multi-engine powerplant system 24, having two engine packages ENG1, ENG2 in the example in FIG. 4. Although FIG. 4 depicts two engines 24, it is understood that aircraft 10 may use a single engine 24. The multi-engine powerplant system 24 generates power available for flight operations and couples such power to the main rotor assembly 18 and the translational thrust system 40 through the MGB 26. The MGB 26 may be interposed between the powerplant system 24, the main rotor assembly 18 and the translational thrust system 40.

A portion of the drive system downstream of the MGB 26 includes a combined gearbox 90 (also referred to as a clutch). The combined gearbox 90 selectively operates as a clutch and a brake for operation of the translational thrust system 40 with the MGB 26. The combined gearbox 90 also operates to provide a rotor brake function for the main rotor assembly 18.

The combined gearbox 90 generally includes an input 92 and an output 94 generally defined along an axis parallel to rotational axis, T. The input 92 is generally upstream of the combined gearbox 90 relative the MGB 26 and the output 94 is downstream of the combined gearbox 90 and upstream of the pusher propeller system 40 (FIG. 2). The combined gearbox 90 may be categorized by the technique used to disengage-engage (e.g., clutch) or stop (e.g., brake) the load such as friction, electromagnetic, mechanical lockup, etc., and by the method used to actuate such as mechanical, electric, pneumatic, hydraulic, self-activating, etc. It should be understood that various combined gearbox 90 systems may be utilized to include but not to be limited to mechanical, electrically, hydraulic and various combinations thereof.

Figure 5:
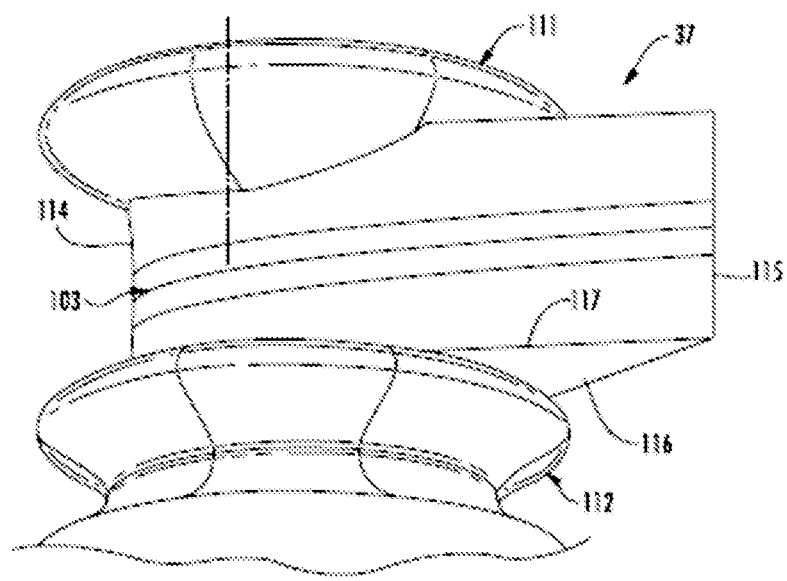
FIG. 5 is a perspective view of a rotor hub fairing in an embodiment.

Referring to FIG. 5, an exemplary rotor hub fairing 37 is shown. Rotor hub fairing 37 is illustrated having generally elliptical, in cross-section, upper and lower hub fairings 111 and 112, and an airfoil-type shape (in horizontal cross-section) for the shaft fairing 103. The airfoil shape of the shaft fairing 103 includes a leading edge 114, and a trailing edge 115 aft of the upper and lower fairings 111, 112. The airfoil shape of the shaft fairing 103 additionally includes a chord (not shown) that connects the leading and trailing edges 114, 115 of the airfoil. In one embodiment, the airfoil shape, including the upper surface 116 and the lower surface 117, is symmetrical about a plane extending along the length of the shaft fairing 103 and containing the axis of rotation, A. In other embodiments, the shaft fairing 103 may be a partial airfoil shape or another shape to reduce drag. As noted above, the upper and lower rotor hubs 38 may be positioned, at least partially, in the upper and lower fairings 111, 112.

Figure 6:
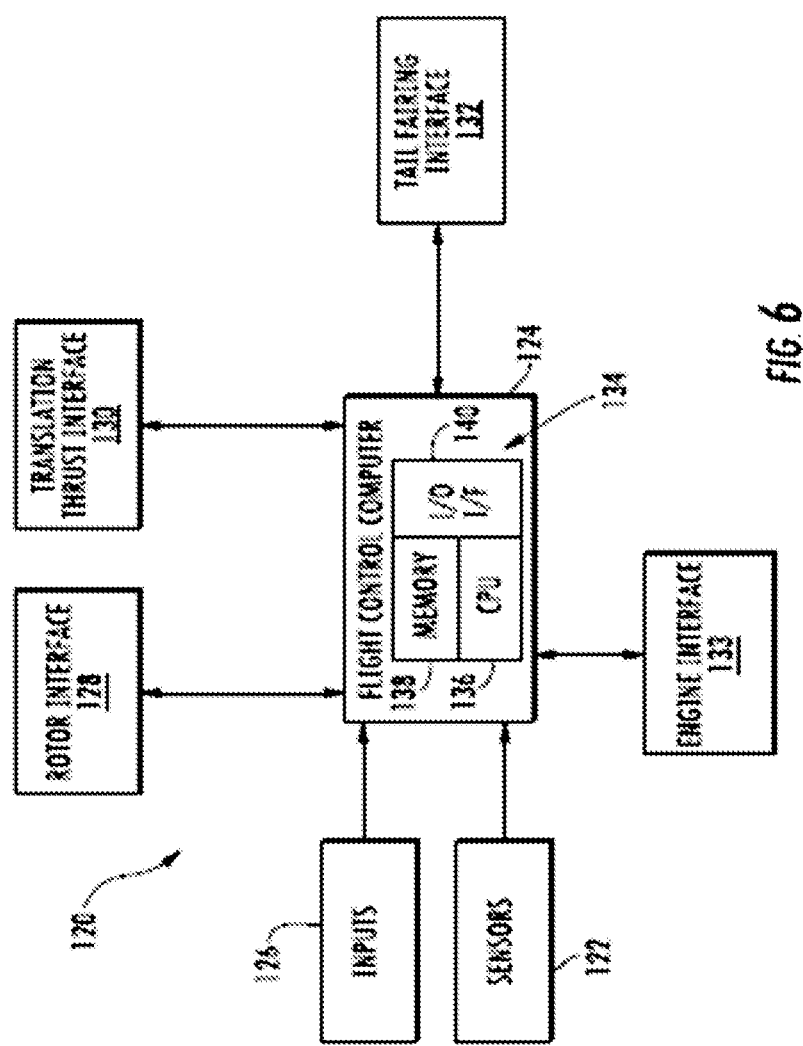
FIG. 6 depicts a flight control system in an embodiment.

Portions of the aircraft 10 are controlled by a flight control system 120 illustrated in FIG. 6. In one embodiment, the flight control system 120 is a fly-by-wire (FBW) control system. In a FBW control system there is no direct mechanical coupling between a pilot's controls and movable components of aircraft 10. Instead of using mechanical linkages, a FBW control system includes a plurality of sensors 122 which can sense the position of controlled elements and generate electrical signals proportional to the sensed position. The sensors 122 may also be used directly and indirectly to provide a variety of aircraft state data to a flight control computer (FCC) 124. The FCC 124 may also receive inputs 126 as control commands from various sources. For instance, the inputs 126 can be pilot inputs, auto-pilot inputs, navigation system based inputs, or any control inputs from one or more control loops executed by the FCC 124 or other subsystems. In response to inputs from the sensors 122 and inputs 126, the FCC 124 transmits signals to various subsystems of the aircraft 10.

Flight control system 120 may include a rotor interface 128 configured to receive commands from the FCC 124 and control one or more actuators, such as a mechanical-hydraulic or electric actuators, for the upper rotor assembly 28 and lower rotor assembly 32. In an embodiment, inputs 126 including cyclic, collective, pitch rate, and throttle commands that may result in the rotor interface 128 driving the one or more actuators to adjust upper and lower swashplate assemblies (not depicted) for pitch control of the upper rotor assembly 28 and lower rotor assembly 32. Alternatively, pitch control can be performed without a swashplate assemblies using individual blade control (IBC) in the upper rotor assembly 28 and lower rotor assembly 32. The rotor interface 128 can manipulate the upper rotor assembly 28 and lower rotor assembly 32 independently. This allows different collective and cyclic commands to be provided to the upper rotor assembly 28 and lower rotor assembly 32.

Flight control system 120 may include a translational thrust interface 130 configured to receive commands from the FCC 124 to control one or more actuators, such as a mechanical-hydraulic or electric actuators, for the control of the translational thrust system 40. In an embodiment, inputs 126 may result in the translational thrust interface 130 controlling speed of propeller 42, altering the pitch of propeller blades 47 (e.g., forward or rearward thrust), altering the direction of rotation of propeller 42, controlling gearbox 90 to employ a clutch to engage or disengage the propeller 42, etc.

Flight control system 120 may include a tail fairing interface 132. The tail fairing interface 132 is configured to receive commands from the FCC 124 to control one or more actuators, such as a mechanical-hydraulic or electric actuators, for the active elevator 43 and/or active rudders 45 of FIG. 2. In an embodiment, inputs 126 include an elevator pitch rate command for the tail fairing interface 132 to drive the one or more actuators for pitch control of the active elevators 43 of FIG. 2. In an embodiment, inputs 126 include a rudder command for the tail fairing interface 132 to drive the one or more actuators for positional control of the active rudders 45 of FIG. 2.

Flight control system 120 may include an engine interface 133. The engine interface 133 is configured to receive commands from the FCC 124 to control engine(s) 24. In an embodiment, inputs 126 include a throttle command from the pilot to adjust the RPM of engine(s) 24. FCC 124 may also send commands to engine interface 133 to control the engine(s) in certain predefined operating modes (e.g., quiet mode).

The FCC 124 includes a processing system 134 that applies models and control laws to augment commands based on aircraft state data. The processing system 134 includes processing circuitry 136, memory 138, and an input/output (I/O) interface 140. The processing circuitry 136 may be any type or combination of computer processors, such as a microprocessor, microcontroller, digital signal processor, application specific integrated circuit, programmable logic device, and/or field programmable gate array, and is generally referred to as central processing unit (CPU) 136. The memory 138 can include volatile and non-volatile memory, such as random access memory (RAM), read only memory (ROM), or other electronic, optical, magnetic, or any other computer readable storage medium onto which data and control logic as described herein are stored. Therefore, the memory 138 is a tangible storage medium where instructions executable by the processing circuitry 136 are embodied in a non-transitory form. The I/O interface 140 can include a variety of input interfaces, output interfaces, communication interfaces and support circuitry to acquire data from the sensors 122, inputs 126, and other sources (not depicted) and communicate with the rotor interface 128, the translation thrust interface 130, tail fairing interface 132, engine interface 133, and other subsystems (not depicted).

In exemplary embodiments, the rotor interface 128, under control of the FCC 124, can control the upper rotor assembly 28 and lower rotor assembly 32 to pitch in different magnitudes and/or different directions at the same time. This includes differential collective, where the upper rotor assembly 28 has a collective pitch different than the collective pitch of the lower rotor assembly 32, in magnitude and/or direction. Differential pitch control also includes differential cyclic pitch control, where the upper rotor assembly 28 has a cyclic pitch different than the cyclic pitch of the lower rotor assembly 32, in magnitude, axis of orientation (e.g., longitudinal or lateral) and/or direction. The differential collective and the differential cyclic pitch control may be accomplished using independently controlled swashplates in the upper rotor assembly 28 and lower rotor assembly 32. Alternatively, differential collective and the differential cyclic pitch control may be accomplished using individual blade control in the upper rotor assembly 28 and lower rotor assembly 32.

The ability to independently control the pitch of the upper rotor assembly 28 and lower rotor assembly 32 allows the lower rotor assembly 32 to be adjusted due to its position beneath the upper rotor assembly 28. The lower rotor assembly 32 is located in the downwash of the upper rotor assembly 28. To accommodate for this, the lower rotor assembly 32 may have a collective pitch that differs from the collective pitch of the upper rotor assembly 28.

In the case of traditional helicopters, as the forward velocity of the aircraft increases, the velocity of the retreating blade relative to the airflow decreases. This causes a stall region to arise at the root of the retreating blade and expand towards to distal end of the blade as speed increases. As this stall region increases, the overall lift vector of the aircraft shifts from the center of the aircraft towards the advancing blade which is providing the majority of lift for the aircraft. This imbalance of lift creates an unstable rolling moment on the aircraft which is stabilized by a combination of reducing forward flight and blade flapping, which reduces overall aircraft lift. With a dual rotor aircraft, such as aircraft 10, the counter rotating rotor heads balance out the torque generated by each rotor head and also balances the lift generated by each advancing blade without the need for blade flapping or reducing the speed of the aircraft. This is made possible by the rigid rotor system. With two rigid rotors, the roll moments cancel at the main rotor shaft.

The use of upper rotor assembly 28 and lower rotor assembly 32 allows the pre-cone angle to be set on each individual rotor to reduce bending stress on the blades. In a hinged rotor design, the hinges will naturally go to an angle to reduce bending stress. On a rigid rotor aircraft, such as aircraft 10, there is no hinge, so the pre-cone angle is set to avoid the extra stress attributed to the bending moment. A useful pre-cone angle is one where the centrifugal force of the blade pulling out matches the lift of the blade up. Due to the independent nature of the upper rotor assembly 28 and lower rotor assembly 32, differential pre-cone is used in aircraft 10. Differential pre-cone refers to the fact that the upper rotor assembly 28 and lower rotor assembly 32 have different pre-cone angles. The different pre-cone angles for the upper rotor assembly 28 and lower rotor assembly 32 help maintain tip clearance. In an exemplary embodiment, the pre-angle on the upper rotor assembly 28 is about 3 degrees and the pre-cone angle on the lower rotor assembly 32 is about 2 degrees.

Aircraft 10 is operational in a variety of modes, including take-off, cruise, landing, etc. Cruise mode refers to generally horizontal flight. During cruise, aircraft 10 can reach speeds of above about 200 knots, with speed reaching up to about 250 knots. During cruise mode, the main rotor assembly 18 provides the majority of lift for the aircraft. In exemplary embodiments and flight modes, the main rotor assembly 18 provides greater than about 85% of the lift during cruise mode.

Aircraft 10 may assume various acoustic modes, depending on the flight state. FCC 124 may control RPM of engines 24, RPM of propeller 42, and clutch 90 to engage or disengage the propeller 42 to assume different noise levels. For example, at take-off noise may not be a concern, and there would be no changes in aircraft operation to adjust the noise level. As the aircraft approaches a target, it may be desirable to disengage the propeller 42 using clutch 90 and/or reduce RPM of engines 24 to reduce the noise produced by aircraft 10. The propeller 42 may be disengaged at various other flight states (e.g., high speed) to reduce noise. The RPM of the main rotor assembly 18 and RPM of propeller 42 may be independently controlled (e.g., through clutch 90 or FCC 124). This allows a variety of flight states to be achieved.

The pilot may enter separate commands to reduce aircraft noise, for example, disengaging the propeller 42, reducing engine RPM, and increasing collective pitch as separate inputs. Alternatively, the pilot may select a reduced noise mode (e.g., quiet mode) through single input, and the FCC 124 controls the various aircraft interfaces to achieve the desired mode. For example, the pilot may select a reduced noise mode at input 126, and the FCC automatically disengages the propeller 42, reduces the engine 24 RPM and/or increases collective pitch without further demand on the pilot.

The use of the translational thrust system 40 allows the aircraft 10 to move forward or rearward (depending on the pitch of the propeller blades) independent of the pitch attitude of the aircraft. Cyclic is used to adjust the pitch attitude (nose up, nose down or level) of the aircraft while the translational thrust system 40 provides forward and rearward thrust to, for example, balance the main rotor system forces to maintain position, or translate with a set body attitude.

The main rotor assembly 18 system and the translational thrust system 40 are connected through the main gear box 26. A gear ratio of main gear box 26 is selected so as to keep propeller 42 at a high efficiency and suitable noise level during cruise mode. The gear ratio of main gear box 26 dictates the ratio of the rotor speed of main rotor assembly 18 to propeller speed of propeller 42.

Figure 11:
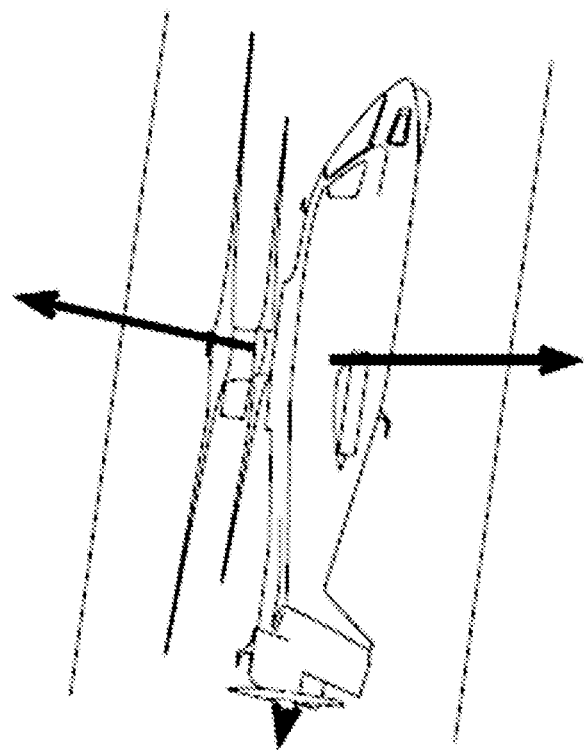
FIGS. 10 and 11 illustrate force vectors in exemplary hover states.
Figure 10:
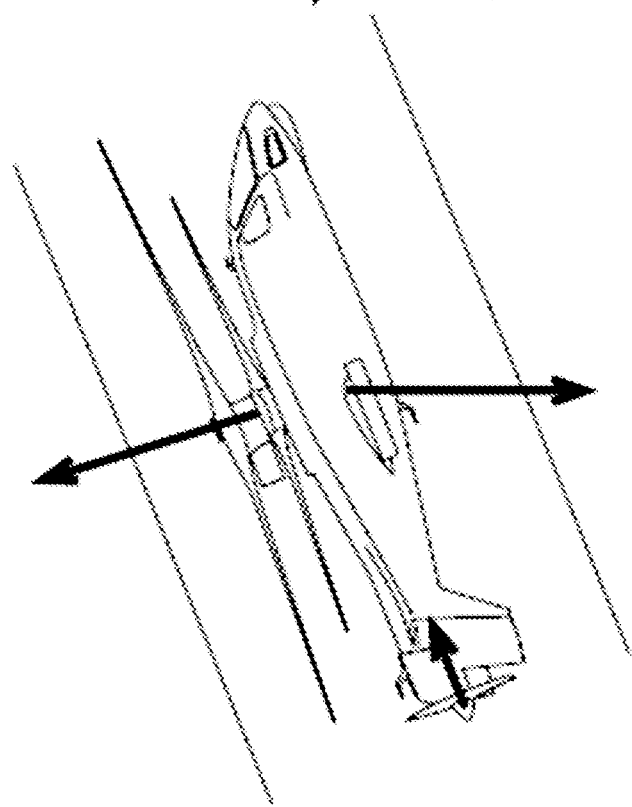

Embodiments of aircraft 10 provide the pilot with increased situational awareness by allowing the aircraft attitude (e.g., the angle of longitudinal axis, L, relative to horizontal) to be adjusted by cyclic pitch of the main rotor assembly 18 and the forward and rearward thrust to be controlled by the translational thrust system 40. This allows a variety of flight modes to be achieved, which allows the pilot to be more aware of their surroundings. Aircraft 10 can take off at a horizontal attitude (e.g., axis L is horizontal), which also may be referred to as vertical take-off. Aircraft 10 may also fly forward or cruise with the nose angled upwards, nose angled downwards or level. Aircraft 10 can hover with the nose angled upwards or downwards or level. FIGS. 10 and 11 illustrate force vectors from the main rotor assembly and propeller for hover nose up and hover nose down, respectively. Aircraft 10 can also land substantially parallel to a non-horizontal or sloped surface by adjusting the attitude of the aircraft using cyclic pitch of the main rotor assembly 18. The use of main rotor assembly 18 for aircraft attitude and the translational thrust system 40 for thrust allows aircraft 10 to assume a variety of trim states.

Embodiments provide independent control of the active elevators 43 and/or active rudders 45 as controllable surfaces in the tail section 41. The elevator surfaces 43 may be controlled independently by the FCC 124 through the tail fairing interface 132. The rudder surfaces 45 may be controlled independently by the FCC 124 through the tail fairing interface 132.

The configuration of aircraft 10 and the controlled afforded by FCC 124 allows aircraft 10 to provide a high bank angle capability at high speeds. For example, in an exemplary embodiment, aircraft 10 can achieve a bank angle of about 60 degrees at about 210 knots.

Aircraft 10 may make use of longitudinal lift offset in trim to compensate for rotor-on-rotor aerodynamic interaction between the upper rotor assembly 28 and lower rotor assembly 32. Aircraft 10 may adjust differential longitudinal cyclic as a function of operational states of the aircraft (e.g., take-off, cruise, land, etc.). Differential longitudinal cyclic refers to upper rotor assembly 28 and lower rotor assembly 32 having different cyclic pitch along the longitudinal axis of the aircraft. Differential longitudinal cyclic may also be used to generate yaw moments. Lift offset may be used to control aircraft, where lateral lift offset adjusts roll and longitudinal lift offset adjusts pitch.

FCC 124 may control RPM of engine(s) 24, RPM of propeller 42, and clutch 90 to engage or disengage the propeller 42 to assume different noise levels. For example, at take-off noise may not be a concern, and there would be no changes in aircraft operation to adjust the noise level. As the aircraft approaches a target, it may be desirable to disengage the propeller 42 using clutch 90 and/or reduce RPM of engines 24 to reduce the noise produced by aircraft 10. The propeller 42 may be disengaged at various other flight states (e.g., high speed) to reduce noise. The RPM of the main rotor assembly 18 and RPM of propeller 42 may be independently controlled (e.g., through clutch 90).

The pilot may enter separate commands to reduce aircraft noise, for example, disengaging the propeller 42 and reducing engine RPM as separate inputs. Alternatively, the pilot may select a reduced noise mode (e.g., quiet mode) through single input, and the FCC 124 controls the various aircraft interfaces to achieve the desired mode. For example, the pilot may select a reduced noise mode at input 126, and the FCC automatically disengages the propeller 42 and/or reduces the engine 24 RPM without further demand on the pilot.

Figure 7:
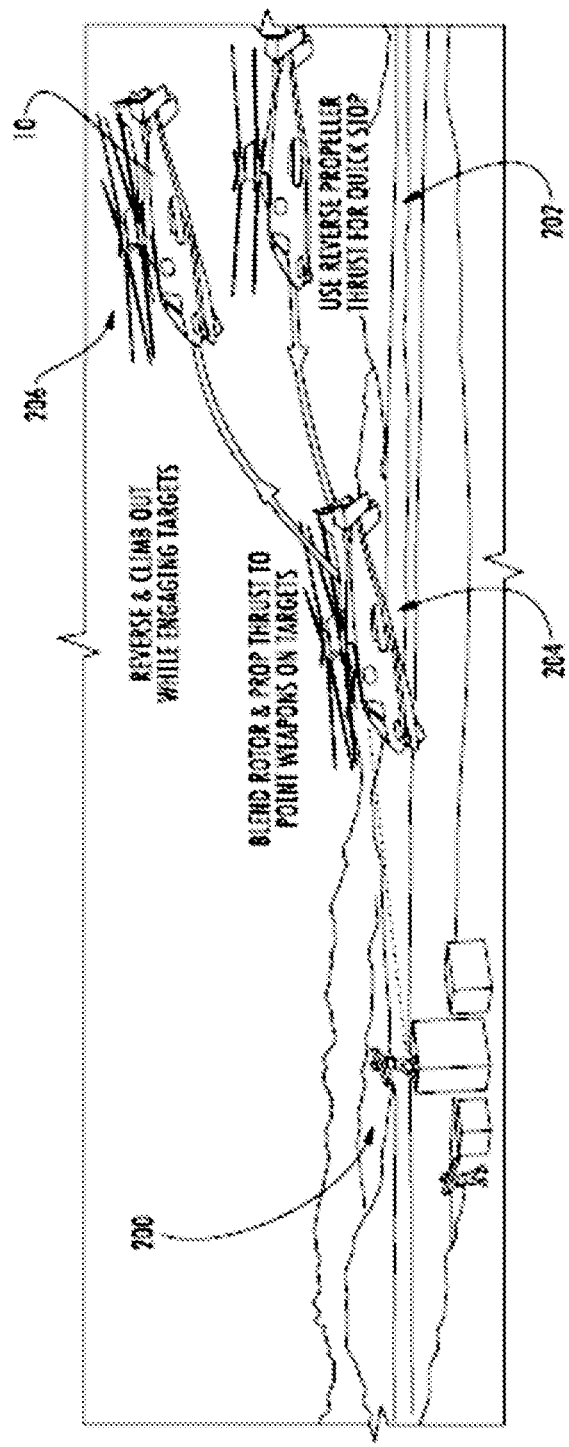
FIG. 7 depicts a flight maneuver in an embodiment.

Aircraft 10 provides the ability to approach a target and reverse thrust while maintaining an attitude directed at the target. FIG. 7 depicts aircraft 10 approaching a target 200. In a first state, 202, the aircraft 10 alters the pitch of blades 47 in propeller 42 to provide reverse thrust to bring the aircraft to a quick stop. At state 204, the main rotor assembly 18 and propeller 42 are controlled to pitch aircraft 10 towards target 200. At state 206, the propeller 42 is used to provide reverse thrust to move away from target 200 and climb, while still maintaining an attitude with the nose of aircraft 10 facing target 200.

The use of a dual rotor system and translational thrust allows aircraft 10 to eliminate the need for a variable angle between the main axis of rotation of the rotor system (e.g., axis A in FIG. 1) and aircraft longitudinal axis L. In conventional helicopters, the angle between the main axis of rotation of the rotor system and the aircraft longitudinal axis L varies. This is due to the fact that conventional helicopters lack a translational thrust system 40 for use during cruise mode, or forward flight. In a conventional helicopter, forward flight is provided through cyclic pitch, which causes the aircraft to point nose down. As this nose down orientation is undesirable beyond a certain angle, the angle between the main axis of rotation of the rotor system and the aircraft longitudinal axis L is adjusted to bring the nose upwards, while still in forward flight.

By contrast, aircraft 10, with translational thrust system 40, does not need to adjust the angle between the main axis of rotation of the rotor system (e.g., axis A in FIG. 1) and aircraft longitudinal axis L. The angle between the main axis of rotation of the rotor system (e.g., axis A in FIG. 1) and aircraft longitudinal axis L for aircraft 10 remains fixed during all flight modes, including take-off, cruise, landing, etc.

As shown in FIG. 1, the rotor assembly 18 includes a rotor hub fairing 37 generally located between and around the upper and lower rotor assemblies such that the rotor hubs 38 are at least partially contained therein. The rotor hub fairing 37 provides drag reduction. Referring to FIG. 5, an exemplary rotor hub fairing 37 is shown. Rotor hub fairing 37 is illustrated having generally elliptical, in cross-section, upper and lower hub fairings 111 and 112, and an airfoil-type shape (in horizontal cross-section) for the shaft fairing 103. The airfoil shape of the shaft fairing 103 includes a leading edge 114, and a trailing edge 115 aft of the upper and lower fairings 111, 112. The airfoil shape of the shaft fairing 103 additionally includes a chord (not shown) that connects the leading and trailing edges 114, 115 of the airfoil. In one embodiment, the airfoil shape, including the upper surface 116 and the lower surface 117, is symmetrical about a plane extending along the length of the shaft fairing 103 and containing the axis of rotation, A. As noted above, the upper and lower rotor hubs 38 may be positioned, at least partially, in the upper and lower fairings 111, 112.

The rotor hub fairing 37 is a sealed fairing, meaning there are few or no passages for air to travel through the interior of the rotor hub fairing 37. In conventional designs, control devices such as pushrods, are exposed near the rotor hubs. The surfaces of these components increase drag on the rotor assembly. The air gaps between various rotor structures (e.g., pushrods and main rotor shaft) also form areas of drag. The sealed rotor hub fairing 37 eliminates air pathways through the rotor hub structure, and eliminates drag associated with such air paths.

Another feature to reduce drag on the rotor hub is positioning control rods, such as push rods for rotor control, internal to the main rotor shaft. Referring to FIG. 3, pushrods for swashplates in the upper rotor assembly 28 and lower rotor assembly 32 are located internal to the lower rotor shaft 46 and upper rotor shaft 50. This prevents the pushrods from being exposed and increasing drag on the rotor hub. The use of a rigid rotor system aids in sealing the rotor hub fairing 37.

In an exemplary embodiment, the distance between the hub of the upper rotor assembly 28 and the hub of the lower rotor assembly 32 ranges from about 2 feet to about 2.5 feet. In another exemplary embodiment, the distance between the hub of the upper rotor assembly 28 and the hub of the lower rotor assembly 32 ranges from about 2.1 feet to about 2.4 feet. In another exemplary embodiment, the distance between the hub of the upper rotor assembly 28 and the hub of the lower rotor assembly 32 is about 2.29 feet (0.7 meters).

Figure 9:
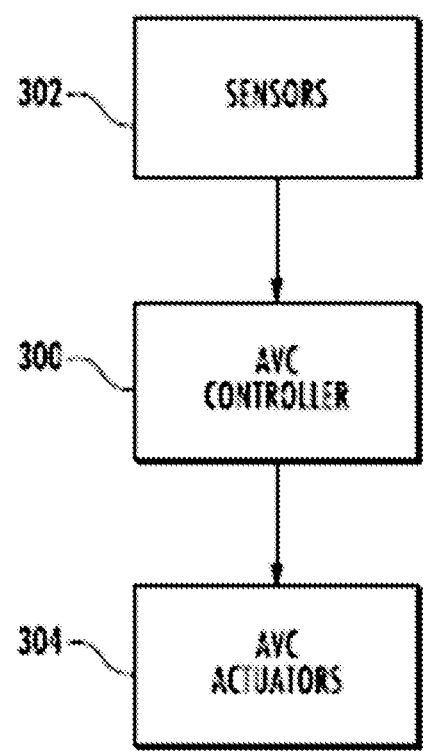
FIG. 9 depicts a schematic of an embodiment of an active vibration control (AVC) system.

Aircraft 10 may employ an active vibration control (AVC) system to reduce vibration in the airframe 12. The use of a dual rotor, rigid rotor system tends to produce significant vibration in the airframe 12 and its systems. FIG. 9 depicts an AVC system in an exemplary embodiment. An AVC controller 300 executes an AVC control process to reduce vibration in aircraft 10. AVC controller 300 may be implemented as part of flight control system 120, executed by FCC 124, or may be a separate controller. One or more sensors 302 are located in aircraft 10 to detect vibration. Sensors may be located in a wide variety of positions, including airframe 12, gearbox 26, tail section 14, on main rotor assembly 18, cockpit, etc. It is understood that these locations are exemplary, and the AVC sensors 302 may be located in any position. AVC actuators 304 generate a force to dampen vibration in aircraft 10, as known in the art. AVC actuators 304 may be located in any position in the aircraft.

In operation, AVC controller 300 receives vibration signals from the AVC sensors 302. AVC controller 300 provides control signals to the AVC actuators 304 to generate forces to reduce the vibration sensed by the AVC sensors 302. Control signals to the AVC actuators 304 may vary in magnitude and frequency to cancel vibrations in aircraft 10. In an exemplary embodiment, AVC controller 300 operates in a feedback mode, where the control signals to AVC actuators 304 are adjusted in response to measured vibration from AVC sensors 302.

In an alternate embodiment, AVC controller 300 does not actively measure vibration through AVC sensors 302. Rather, the AVC controller 300 obtains the rotor speed (e.g., through an RPM signal) and applies a control signal to the AVC actuators 304, in an open loop control mode.

The use of independently controlled upper rotor assembly 28 and the lower rotor assembly 32, along with other control surfaces, provides the ability to control yaw using a variety of elements. For example, below a first speed, (e.g., 40 knots), the FCC 124 uses differential collective pitch for yaw control. Above the first speed but below a second speed (e.g., 80 knots), a mix of differential collective and differential cyclic may be used to control yaw. The differential cyclic may be applied along the longitudinal and/or lateral axes of the aircraft. Further, wind direction may be measured by a sensor 122 and used to adjust the differential cyclic about the longitudinal and/or lateral axes. Above the second speed (e.g., 80 knots), the active rudders 45 are used as controllable surfaces to control yaw. The FCC 124 provides commands to the tail fairing interface 132 to control the rudders 45 to adjust yaw.

The use of active elevator 43, with independent control of a left elevator section and a right elevator section, provides for improved stability control. Flight control system 120 performs mixing of collective pitch of main rotor assembly 18 and an angle of elevator 43 to provide stability augmentation.

Figure 6A:
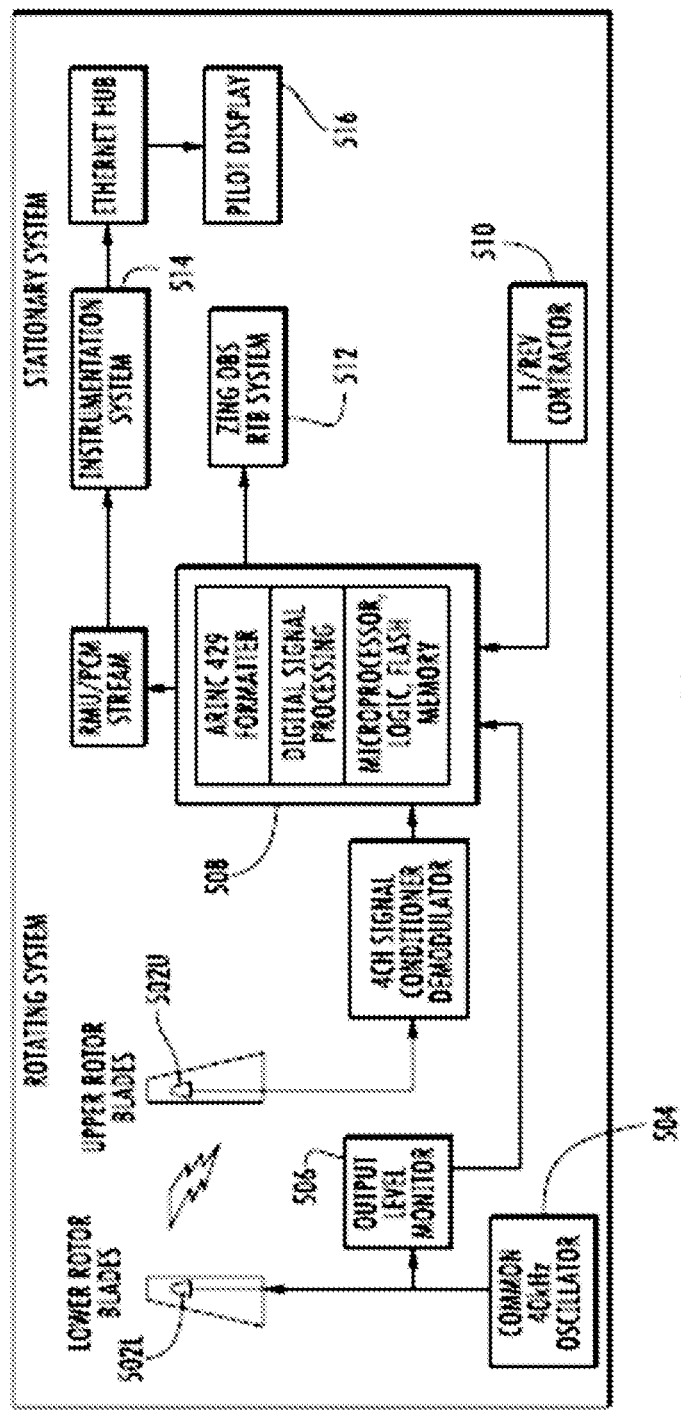
FIG. 6A depicts a blade proximity detection system in an embodiment.

Embodiments may use wireless techniques to provide tip clearance measurements. FIG. 6A depicts a blade proximity monitoring system in an exemplary embodiment. At least one upper rotor blade and at least one lower rotor blade is equipped with at least one antenna 502. Antennas 502 may be electric field antennas or magnetic field antennas. Antennas 502 may be implemented using compact ferrite core or small diameter magnet wire in the form of coils around the blade spar or embedded in the plane of the blade skin. The antennas 502 interact through the near field effect.

An oscillator 504 sends an excitation signal (e.g., 40 KHz) to a first antenna 502L. It is understood that the excitation signal may be sent to a plurality of antennas in different blades, including multiple antennas in the same blade. As the blades cross, a second antenna, 502U, receives a signal emitted by the first antenna 502 L. An output level monitor 506 measures the magnitude of the excitation signal.

A blade proximity monitor 508 (e.g., a processor implemented controller) is mounted in the rotating system, e.g., in a rotor hub. This eliminates noise that may be introduced through a conventional slip ring used to convey signals from a rotating system to a stationary system. The blade proximity monitor 508 receives an output signal from the second antenna 502U and the magnitude of the excitation signal from the output level monitor 506. Output signal from the second antenna 502U may be amplified. The blade proximity monitor 508 also receives a RPM signal of the main rotor assembly 18 from a contactor 510. Based on the magnitude of the excitation signal applied to the first antenna 502L and the magnitude of the output signal from the second antenna 502U, blade proximity monitor 508 can detect the distance between the first antenna 502L and the second antenna 502U. This provides an indication of the distance between the rotor blades. The larger the magnitude of the output signal from second antenna 502U, the closer the blades.

The blade proximity monitor 508 may output the measured distance between the blades to a rotor track and balance unit 512. The blade proximity monitor 508 may output the measured distance between the blades to instrument system 514 and to a pilot display 516. If the measured distance goes below a threshold, then an alert may be generated to the pilot that the blades of the upper rotor assembly 32 and the lower rotor assembly 28 are too close to each other.

The use of a dual rotor, main rotor assembly 18 allows improvements in control of main rotor assembly 18. Flight control system 120 may apply different control envelopes to the upper rotor assembly 28 and the lower rotor assembly 32. Flight control system 120 may impose different control ranges the upper rotor assembly 28 and the lower rotor assembly 32 including control elements such as prioritization, gang vs. differential, collective versus cyclic, etc. The upper rotor assembly 28 and the lower rotor assembly 32 may be independently controlled through the use of separate upper and lower swashplates. Alternatively, the upper rotor assembly 28 and the lower rotor assembly 32 may be independently controller using individual blade control (IBC) techniques.

Aircraft 10 employs a fly-by-wire (FBW) control system to reduce pilot work load. In an exemplary embodiment, FCC 124 determines the aircraft airspeed based on one or more sensors 122. The FCC 124 then adjusts the collective pitch of the upper rotor assembly 28 and/or the lower rotor assembly 32 in response to the airspeed. FCC 124 may use a look up table that indexes airspeed to collective pitch. Alternatively, FCC 124 may use an algorithm to compute the collective pitch based on airspeed. As noted above, the collective pitch of upper rotor assembly 28 and the lower rotor assembly 32 may be the same or different.

Another feature to reduce pilot workload includes automatically adjusting the RPM and/or pitch of propeller 42 in response to a velocity or acceleration command from the pilot. Conventional systems would require the pilot to adjust propeller RPM and/or pitch through individual inputs. The flight control system 120 allows the pilot to enter a desired velocity or an acceleration, and the FCC 124 generates the proper commands to the translational thrust interface 130 to establish an RPM and/or pitch to meet the desired velocity or acceleration.

In exemplary embodiments, the flight control system 120 controls the main rotor assembly 18 to prevent the tips of rotor blades 36 from exceeding the rotor tip threshold speed. During cruise operation of the aircraft 10 at high airspeeds, in some embodiments greater than about 200 knots airspeed, the main rotor assembly 18 is slowed down (within practical constraints) and operated in a "semi-autorotative" manner to maximize its efficiency, and propulsive force provided by the propeller 42. It is appreciated that while an aft tilt of the main rotor assembly 18 increases the autorotative state of the main rotor assembly 18, reducing main rotor assembly 18 power requirements and increasing its efficiency, the aft tilt of the rotor thrust vector increases the propulsive force that must be delivered by the propeller 42. Further, the flight control system 120 controls the rotational speed of the main rotor assembly 18. In exemplary embodiments, the threshold rotor tip speed may be Mach 0.9. This threshold would prevent the rotor blade tips from exceeding the speed of sound. The threshold speed may vary, and may be set to limit drag on the rotor blades to below a certain level. In one embodiment, the FCC 124 determines air temperature, airspeed and/or wind speed and direction from sensors 122 as well as airspeed of the aircraft 10. FCC 124 may also determine prevailing wind speed and direction from sensors 122. The FCC 124 then computes the threshold speed based on the speed of sound (e.g., Mach 1) at the sensed air temperature. The FCC 124 may set the threshold to Mach 0.9, for example. FCC 124 then controls RPM of the main rotor assembly 18 to prevent the rotor blade tips from exceeding the threshold. In an exemplary embodiment, the FCC maintain 85% of the nominal rotor RPM. FCC 124 may take into account prevailing wind direction and speed in controlling the RPM of the main rotor assembly 18. The Mach 0.9 rotor tip speed threshold is only one example, and other rotor tip speed thresholds may be employed to achieve desired results (e.g., reduce drag).

Figure 12:
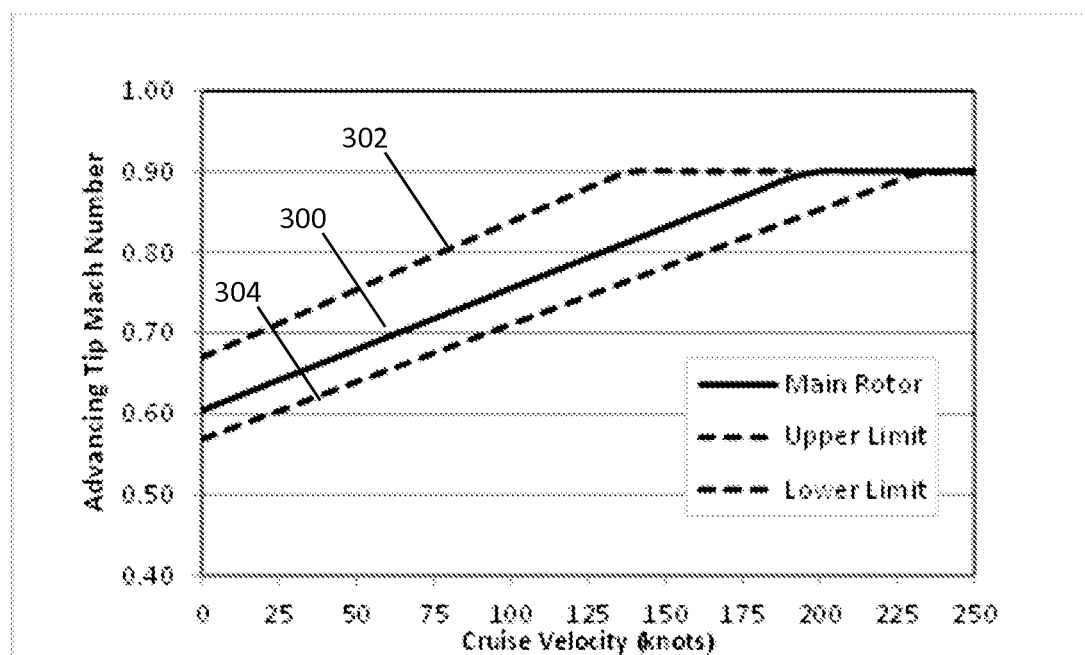
FIG. 12 is a plot of main rotor assembly blade tip Mach number versus airspeed.

The main rotor assembly 18 is configured for both hover and cruise performance. Referring to FIG. 12, in hover operation the rotor tip speed 300 is maintained between rotor upper limit 302 and rotor lower limit 304 between about Mach 0.57 and Mach 0.68 to maximize hover lift capability while also limiting noise. As cruise velocity is increased from zero at hover, the rotor tip speed increases toward the threshold of Mach 0.9 at between about 200-250 knots velocity, or airspeed. The main rotor tip speed is limited as the airspeed increases in order to limit drag due to compressibility of the airflow. If hover rotor tip speed is high, tip speed reduction is needed for a given cruise speed to maintain the rotor tip speed below Mach 0.9. This is achieved by reducing engine RPM, so in some embodiments available engine RPM max be limited by rotor tip speed, in some embodiments to about 80-85% of engine max RPM.

Figure 13:
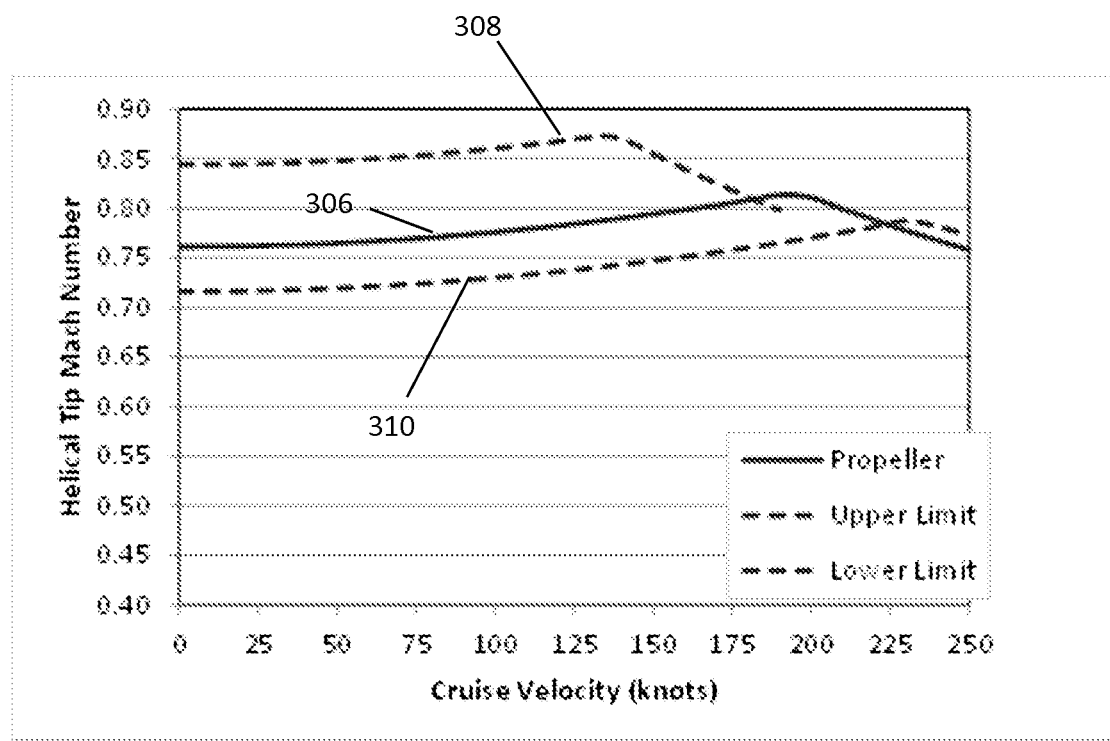
FIG. 13 is a plot of propeller helical blade tip Mach number versus airspeed.

Referring to FIG. 13, the propeller 42 is configured to achieve selected efficiency while not exceeding thresholds for noise when operating at 100% RPM. For the propeller, the helical tip Mach number is the vector sum of the propeller tip speed and the free stream and can be a driving parameter for compressibility which can adversely affect performance and acoustics. In some embodiments, a propeller helical tip speed 306 is maintained between a propeller upper limit 308 and a propeller lower limit 310, between about Mach of 0.72 and 0.84 in hover, and limited to a peak of Mach 0.88 and a more optimal propeller helical tip Mach Number of 0.76 to 0.80 at cruise speeds from 200 to 250 knots.

Gearbox 26 components, such as includes an upper and lower bull gears 44 and 48, input bevel gear 54 are sized to achieve a gear ratio that maintains the rotor tip speed and propeller helical tip speeds within the ranges described above.

In exemplary embodiments, active elevator 43 is configured and controlled to improve stability by compensating for forces such as propeller torque and/or rotor downwash. Elevator 43 includes a left elevator and a right elevator on opposite sides of the axis of rotation of the propeller 42. The left elevator and right elevator may be independently controlled to assume different positions. The tail fairing interface 132 is configured to receive commands from the FCC 124 to control one or more actuators, such as a mechanical-hydraulic or electric actuators, to position the left elevator and right elevator independently. This independent control of the left elevator and right elevator aids in compensating propeller torque and/or rotor downwash.

The left elevator and right elevator may also have different physical configurations to compensate for compensating propeller torque and/or rotor downwash. The left elevator and right elevator may be offset relative to each other along the longitudinal and/or lateral axes of aircraft 10. Further, the left elevator and right elevator may have different geometries where one of the left elevator and right elevator is larger than the other along the longitudinal and/or lateral axes of aircraft 10. The left elevator and right elevator may have differing aerodynamic surfaces (e.g., airfoils) as well.

The cockpit of aircraft includes a single, semi-active, collective input (e.g., stick) positioned between the two pilot seats.

Figure 8:
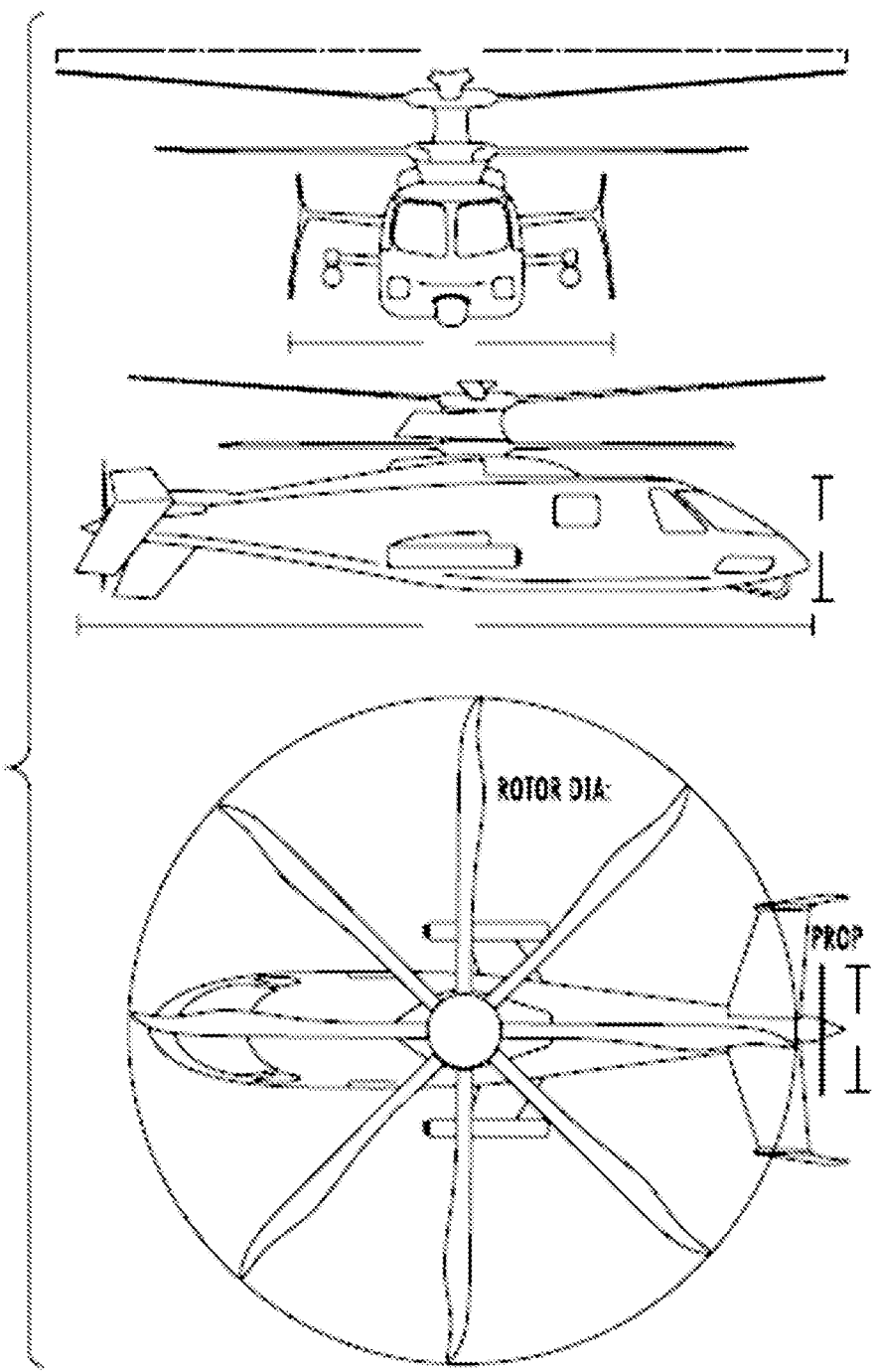
FIG. 8 depicts front, side and top views of an embodiment of an aircraft.

Exemplary embodiments of aircraft 10 provide a much smaller footprint than existing aircraft. This makes aircraft 10 well suited for missions in confined terrain, urban settings, and shipboard operations. FIG. 8 presents front, side and top views of an exemplary aircraft. One feature contributing to the reduced footprint is the location of the main rotor shaft relative to the airframe 12. As shown in FIG. 1, the axis of rotation A, of the main rotor assembly 18, intersects longitudinal axis, L, along a span of axis L, extending from the nose of the aircraft to the tip of the hub of propeller 42. In an exemplary embodiment, the axis of rotation A is located at about a 44% station (STA) of the fuselage or airframe 12.

In an exemplary embodiment, there is about 5.2 inches from the main rotor pylon to the blade hub centerline. In an exemplary embodiment, there is about 0.7 inch hub clearance to the main rotor pylon. In an exemplary embodiment, the rotor blades 36 extend beyond the nose of the aircraft by about 13 inches (0.33 meters). In an exemplary embodiment, rotor blades 36 extend beyond the nose of the aircraft by about 6.9% of the blade span, which may be about 188 inches.

The use of a rigid rotor system, along with the rotor shaft position (e.g., axis A) allows for much easier air-to-air refueling. The stiff rotor blades 36 ease air-to-air refueling by reducing blade flapping, which may result in a blade contacting a tanker fuel line during refueling.

Aircraft 10 provides an improved glide slope ratio of about 5-to-1 to about 6-to-1. This is due to the propeller 42 taking energy out of the airstream, inputting energy into the gear box 26 to increase the speed of the main rotor assembly 18 during autorotation. As shown in FIGS. 3 and 4, the main gear box 26 interconnects the main rotor assembly 18 and propeller 42. During autorotation, the airflow rotates propeller 42, which will subsequently rotate the main rotor assembly 18 and thus increase lift. Propeller 42 also helps stabilize aircraft 10 during decent by acting like a parachute and a rudder, both slowing aircraft 10 and helping to direct aircraft 10 to maintain control. The ability to fly aircraft 10 in a nose down attitude also improves glide slope ratio.

In an exemplary embodiment, the distance between the hub of the upper rotor assembly 28 and the hub of the lower rotor assembly 32 ranges from about 2 feet to about 2.5 feet. In another exemplary embodiment, the distance between the hub of the upper rotor assembly 28 and the hub of the lower rotor assembly 32 ranges from about 2.1 feet to about 2.4 feet. In another exemplary embodiment, the distance between the hub of the upper rotor assembly 28 and the hub of the lower rotor assembly 32 is about 2.29 feet. In another exemplary embodiment, the distance between a midpoint of a blade in the upper rotor assembly 28 and a midpoint of a blade in the lower rotor assembly 32 is about 29.0 inches. In another exemplary embodiment, the distance between a tip of a blade in the upper rotor assembly 28 and a tip of a blade in the lower rotor assembly 32 is about 31.0 inches. In another exemplary embodiment, the distance between the hub of the upper rotor assembly 28 and the hub of the lower rotor assembly 32 is about 14% of the blade span, which may be about 188 inches.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:
1. An aircraft comprising:
an airframe having an extending tail;
a counter rotating, coaxial main rotor assembly disposed at the airframe including an upper rotor assembly having a first plurality of rotor blades and a lower rotor assembly having a second plurality of rotor blades; and a translational thrust system positioned at the extending tail and providing translational thrust to the airframe, the translational thrust system including a propeller;

a gearbox system operably connected to the main rotor assembly and the propeller to drive rotation of the main rotor assembly and the propeller;

a flight control computer (FCC); and a flight control system operably coupled to the main rotor assembly and the propeller, the flight control system having a rotor interface for controlling a rotational speed of the main rotor assembly and a translational thrust interface for controlling a rotational speed of the propeller, wherein during operation of the counter rotating, coaxial main rotor system and the propeller, the flight control system is operable to determine a threshold speed based on the speed of sound at a sensed air temperature and control the main rotor system to limit the tip speed of each of the first plurality of rotor blades and the second plurality of rotor blades to below the threshold speed that is below Mach 0.9 and to limit the tip speed of the propeller helical tip speed to the threshold speed that is below Mach 0.88, wherein the FCC issues commands to the flight control system to limit the propeller helical tip speed to be between Mach 0.76 and Mach 0.80 during cruise speeds of between 200 knots to 250 knots.

2. The aircraft of claim 1, wherein the gearbox is configured to maintain the main rotor assembly tip speed between Mach 0.57 and Mach 0.68 during hover operation of the aircraft.

3. The aircraft of claim 1, wherein the gearbox is configured to maintain the propeller helical tip speed between Mach 0.72 and Mach 0.84 during hover operation of the aircraft.

4. The aircraft of claim 1, wherein the FCC limits the main rotor assembly tip speed to Mach 0.9 during cruise speeds of between 200 knots to 250 knots.

* * * * *